United States Patent
Oh et al.

(10) Patent No.: US 10,166,834 B2
(45) Date of Patent: Jan. 1, 2019

(54) HEATING SYSTEM OF HYBRID VEHICLE AND METHOD FOR CONTROLLING THE SAME

(71) Applicant: Hyundai Motor Company, Seoul (KR)

(72) Inventors: Man Ju Oh, Whasung-Si (KR); Jae Woo Park, Whasung-Si (KR); Jae Woong Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 280 days.

(21) Appl. No.: 14/943,970

(22) Filed: Nov. 17, 2015

(65) Prior Publication Data

US 2017/0021694 A1    Jan. 26, 2017

(30) Foreign Application Priority Data

Jul. 23, 2015  (KR) .................. 10-2015-0104570

(51) Int. Cl.
*B60H 1/03* (2006.01)
*B60H 1/00* (2006.01)
*B60H 1/02* (2006.01)

(52) U.S. Cl.
CPC ..... *B60H 1/00271* (2013.01); *B60H 1/00385* (2013.01); *B60H 1/00478* (2013.01); *B60H 1/034* (2013.01); *B60H 2001/00307* (2013.01)

(58) Field of Classification Search
CPC ............ B60H 1/00271; B60H 1/00385; B60H 1/00478; B60H 1/034; B60H 2001/00307
USPC ........................ 237/5, 8 A, 12.3 B
See application file for complete search history.

(56) References Cited

U.S. PATENT DOCUMENTS

| | | | | |
|---|---|---|---|---|
| 5,291,960 A | * | 3/1994 | Brandenburg | B60H 1/00492 123/41.14 |
| 5,549,153 A | * | 8/1996 | Baruschke | B60H 1/00278 165/42 |
| 6,002,105 A | * | 12/1999 | Tamada | B60H 1/00064 219/202 |
| 6,278,083 B1 | * | 8/2001 | Schwarz | B60H 1/0005 219/202 |
| 9,718,453 B2 | * | 8/2017 | Teraya | B60W 10/06 |

(Continued)

FOREIGN PATENT DOCUMENTS

| | | | |
|---|---|---|---|
| JP | 2009255739 A | * | 11/2009 |
| JP | 2012-096695 A | | 5/2012 |

(Continued)

OTHER PUBLICATIONS

"Definition at—Dictionary-com.pdf", http://www.dictionary.com, May 1, 2017.*

(Continued)

*Primary Examiner* — Gregory Huson
*Assistant Examiner* — Daniel E Namay
(74) *Attorney, Agent, or Firm* — Morgan, Lewis & Bockius LLP

(57) ABSTRACT

A heating system may include a cooling water line connected to a vehicle engine, a heat exchanger provided at the cooling line, the heat exchanger being arranged within an air conditioning duct, thermoelectric elements each attached, and a controller for controlling start or stop of the engine, to maintain a temperature of the cooling water between an upper limit temperature and a lower limit temperature.

13 Claims, 9 Drawing Sheets

(56) References Cited

U.S. PATENT DOCUMENTS

| | | | | |
|---|---|---|---|---|
| 2001/0018832 A1* | 9/2001 | Matsunaga | B60H 1/00485 | 62/239 |
| 2004/0000161 A1* | 1/2004 | Khelifa | B60H 1/00392 | 62/324.1 |
| 2009/0071178 A1* | 3/2009 | Major | B60H 1/00278 | 62/239 |
| 2009/0193830 A1* | 8/2009 | Yoshioka | B60H 1/0005 | 62/239 |
| 2011/0005255 A1* | 1/2011 | Tanihata | B60H 1/00785 | 62/238.7 |
| 2011/0296855 A1* | 12/2011 | Johnston | B60L 3/0046 | 62/79 |
| 2012/0118988 A1* | 5/2012 | Lee | B60H 1/143 | 237/12.3 R |
| 2012/0122000 A1* | 5/2012 | Lee | B60H 1/2218 | 429/429 |
| 2012/0145804 A1* | 6/2012 | Ishii | B60H 1/00485 | 237/12.3 R |
| 2012/0297805 A1* | 11/2012 | Kamada | B60H 1/00278 | 62/208 |
| 2013/0055751 A1* | 3/2013 | Inaba | B60H 1/2218 | 62/498 |
| 2013/0168458 A1* | 7/2013 | Ichishi | B60H 1/004 | 237/2 A |
| 2013/0192271 A1* | 8/2013 | Barnhart | F25B 21/04 | 62/3.3 |
| 2013/0192272 A1* | 8/2013 | Ranalli | F25B 21/04 | 62/3.3 |
| 2014/0008450 A1* | 1/2014 | Gu | B60H 1/034 | 237/12.3 R |
| 2014/0034266 A1* | 2/2014 | Tabei | B60H 1/00764 | 165/42 |
| 2014/0144998 A1* | 5/2014 | Ichishi | B60H 1/00314 | 237/12.3 A |
| 2014/0182832 A1* | 7/2014 | Styles | B60H 1/00278 | 165/202 |
| 2014/0194048 A1* | 7/2014 | Wittmann | B60H 1/0005 | 454/139 |
| 2014/0353392 A1* | 12/2014 | Park | B60H 1/00885 | 237/12.3 B |
| 2015/0033782 A1* | 2/2015 | Kondo | B60H 1/00921 | 62/244 |
| 2015/0189700 A1* | 7/2015 | Kim | H05B 1/0236 | 219/539 |
| 2015/0191179 A1* | 7/2015 | Teraya | B60W 10/06 | 701/22 |
| 2016/0137021 A1* | 5/2016 | Morisita | B60H 1/00007 | 165/61 |
| 2016/0137036 A1* | 5/2016 | Oh | B60H 3/024 | 62/3.4 |
| 2016/0339900 A1* | 11/2016 | Li | B60H 1/004 | |
| 2016/0347150 A1* | 12/2016 | Kakade | B60H 1/00885 | |
| 2017/0072771 A1* | 3/2017 | Watanabe | B60H 1/00521 | |
| 2017/0174045 A1* | 6/2017 | Shimauchi | B60H 1/00064 | |

FOREIGN PATENT DOCUMENTS

| | | | | |
|---|---|---|---|---|
| JP | 2012126157 A | * | 7/2012 | ......... B60H 1/00485 |
| JP | 2013244844 A | * | 12/2013 | ......... B60H 1/00921 |
| KR | 20-1998-0047782 U | | 9/1998 | |
| KR | 10-2008-0008875 A | | 1/2008 | |
| KR | 10-2009-0058075 A | | 6/2009 | |
| KR | 10-2009-0080184 A | | 7/2009 | |
| WO | WO 2010/135363 A2 | | 11/2010 | |

OTHER PUBLICATIONS

"Definition at—Websters.pdf", The New Lexicon Webster's Encyclopedic Dictionary of the English Language Deluxe Edition, Lexicon Publications, Inc., NY, (c) 1990, p. 58.*

* cited by examiner

HEATING SYSTEM OF HYBRID VEHICLE AND METHOD FOR CONTROLLING THE SAME

CROSS-REFERENCE TO RELATED APPLICATION

The present application claims the priority benefit of Korean Patent Application No. 10-2015-0104570, filed on Jul. 23, 2015, the disclosure of which is incorporated herein by reference.

BACKGROUND OF THE INVENTION

Field of the Invention

The present invention relates to a heating system of a hybrid vehicle capable of achieving an improvement in fuel economy of the hybrid vehicle and a method for controlling the same.

Description of Related Art

Generally, vehicles are equipped with an air conditioning apparatus, which adjusts passenger compartment temperature for user convenience, not only to provide a pleasant environment, but also to remove frost or dew formed on vehicle windows, to secure driver visibility, thereby being capable of securing stable travel.

Such an air conditioning apparatus includes cooling and heating systems for adjusting passenger compartment temperature to a temperature desired by passengers. In the cooling system, an evaporator core is provided at a refrigerant line. Cold refrigerant circulates through the evaporator core, and ambient air passes around the evaporator core and, as such, the refrigerant in the evaporator core exchanges heat with the ambient air, thereby cooling air to be supplied to a passenger compartment.

In the heating system, a heater core is provided at a cooling water line. Hot cooling water circulates through the heater core, and ambient air passes around the heater core and, as such, the cooling water in the heater core exchanges heat with the ambient air, thereby heating air to be supplied to the passenger compartment.

In the heating system, during driving of an engine, cooling water absorbs heat generated from an engine or absorbs heat generated from electronic parts in the case of an electric vehicle or a hybrid vehicle, and supplies the absorbed heat to the heater core. During initial engine start, however, heat is insufficiently generated from the engine and, as such, temperature of the cooling water may be insufficient. Meanwhile, heat supplied from electronic parts of an electric vehicle or a hybrid vehicle may be insufficient to heat passenger compartment air. To this end, in such a hybrid vehicle, the engine thereof starts to supplement shortage of thermal energy, even when engine power is not needed. For this reason, fuel economy may be degraded.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a heating system of a hybrid vehicle, which performs air conditioning using a thermoelectric element in addition to a heater core, to reduce start time of an engine for heat operation, thereby being capable of achieving an improvement in fuel economy, and a method for controlling the same.

In accordance with the present invention, the above and other objects can be accomplished by the provision of a heating system of a hybrid vehicle including a cooling water line connected to an engine of the vehicle, at least one heat exchanger provided at the cooling line such that cooling water flows through the heat exchanger, the heat exchanger being arranged within an air conditioning duct, through which air flows, one or more thermoelectric elements each attached, at one surface thereof, to the heat exchanger while being exposed, at the other surface thereof, to air flowing through the air conditioning duct such that the other surface functions as a heating surface, and a controller for controlling start or stop of the engine, to maintain a temperature of the cooling water between an upper limit temperature and a lower limit temperature while controlling operation of the thermoelectric elements such that a temperature measured at an outlet of the air conditioning duct satisfies a target temperature.

The controller may control the engine to stop when the measured temperature at the outlet of the air conditioning duct satisfies the target temperature, and the temperature of the cooling water reaches the upper limit temperature during operation of the engine.

The heating system may further include a heater core provided at the cooling water line such that the cooling water flows through the heater core while being arranged within the air conditioning duct, through which air flows. The heater core and the heat exchanger may have a cooling water inlet in common such that the cooling water is introduced into both the heater core and the heat exchanger through the common cooling water inlet. The heater core and the heat exchanger may have a cooling water outlet in common such that the cooling water from the heater core and the cooling water from the heat exchanger are simultaneously discharged into the cooling line through the common cooling water outlet.

Alternatively, the heating system may further include a heater core provided at the cooling water line such that the cooling water flows through the heater core while being arranged within the air conditioning duct, through which air flows, and the cooling water may first flow through one of the heater core and the heat exchanger, and may then flow the other of the heater core and the heat exchanger.

The at least one heat exchanger may include a plurality of heat exchangers arranged within the air conditioning duct.

The heating system may include a cooling water temperature sensor for sensing a temperature of cooling water of the engine, and a discharge air temperature sensor for sensing a temperature of discharge air supplied to a passenger compartment.

In accordance with another aspect of the present invention, there is provided a method for controlling the heating system, including lower limit determination for comparing the cooling water temperature with the lower limit temperature, to determine whether or not the cooling water temperature is lower than the lower limit temperature, and upper limit determination for comparing the cooling water temperature with the upper limit temperature, to determine whether or not the cooling water temperature is higher than the upper limit temperature, wherein the engine is controlled to operate when the cooling water temperature is lower than the lower limit temperature, and is controlled to stop when the cooling water temperature is higher than the upper limit temperature.

The method may further include primary temperature determination for determining whether or not a temperature of discharge air supplied to a passenger compartment is lower than the target temperature. When it is determined through the primary temperature determination that the discharge air temperature is lower than the target temperature, the number of thermoelectric elements to be operated may be increased, and the primary temperature determination may then be again executed.

When it is determined through the primary temperature determination that the temperature of discharge air supplied to the passenger compartment is not lower than the target temperature, the number of thermoelectric elements to be operated may be reduced.

The method may further include secondary temperature determination for determining whether or not the temperature of discharge air supplied to the passenger compartment is equal to the target temperature. When it is determined through the secondary temperature determination that the discharge air temperature is equal to the target temperature, operation of the thermoelectric elements may be stopped.

When it is determined through the secondary temperature determination that the discharge air temperature is not equal to the target temperature, the number of thermoelectric elements to be operated may be reduced, and the secondary temperature determination may then be again executed.

In accordance with another aspect of the present invention, there is provided a method for controlling the heating system, including lower limit determination executed by the controller to compare a temperature of cooling water sensed by a cooling water temperature sensor with the lower limit temperature, and to determine whether or not the sensed cooling water temperature is lower than the lower limit temperature, upper limit determination executed by the controller to compare the sensed cooling water temperature with the upper limit temperature, and to determine whether or not the sensed cooling water temperature is higher than the upper limit temperature, wherein the engine is controlled by the controller to operate when the sensed cooling water temperature is lower than the lower limit temperature, and is controlled by the controller to stop when the sensed cooling water temperature is higher than the upper limit temperature.

The method may further include primary temperature determination executed by the controller to sense the temperature of discharge air supplied to the passenger compartment by a discharge air temperature sensor, and to determine whether or not the sensed temperature is lower than the target temperature. When it is determined through the first temperature determination that the discharge air temperature is lower than the target temperature, the number of thermoelectric elements to be operated may be increased by the controller, and the primary temperature determination may then be again executed by the controller.

The method may further include secondary temperature determination executed by the controller to sense the temperature of discharge air supplied to the passenger compartment by the discharge air temperature sensor, and to determine whether or not the sensed temperature is equal to the target temperature. When it is determined through the secondary temperature determination that the sensed temperature is equal to the target temperature, the thermoelectric elements may be controlled to be stopped by the controller.

In accordance with the heating system of the hybrid vehicle according to the present invention and the control method thereof, the start time of the engine is reduced and, as such, an effect of achieving an improvement in fuel economy may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
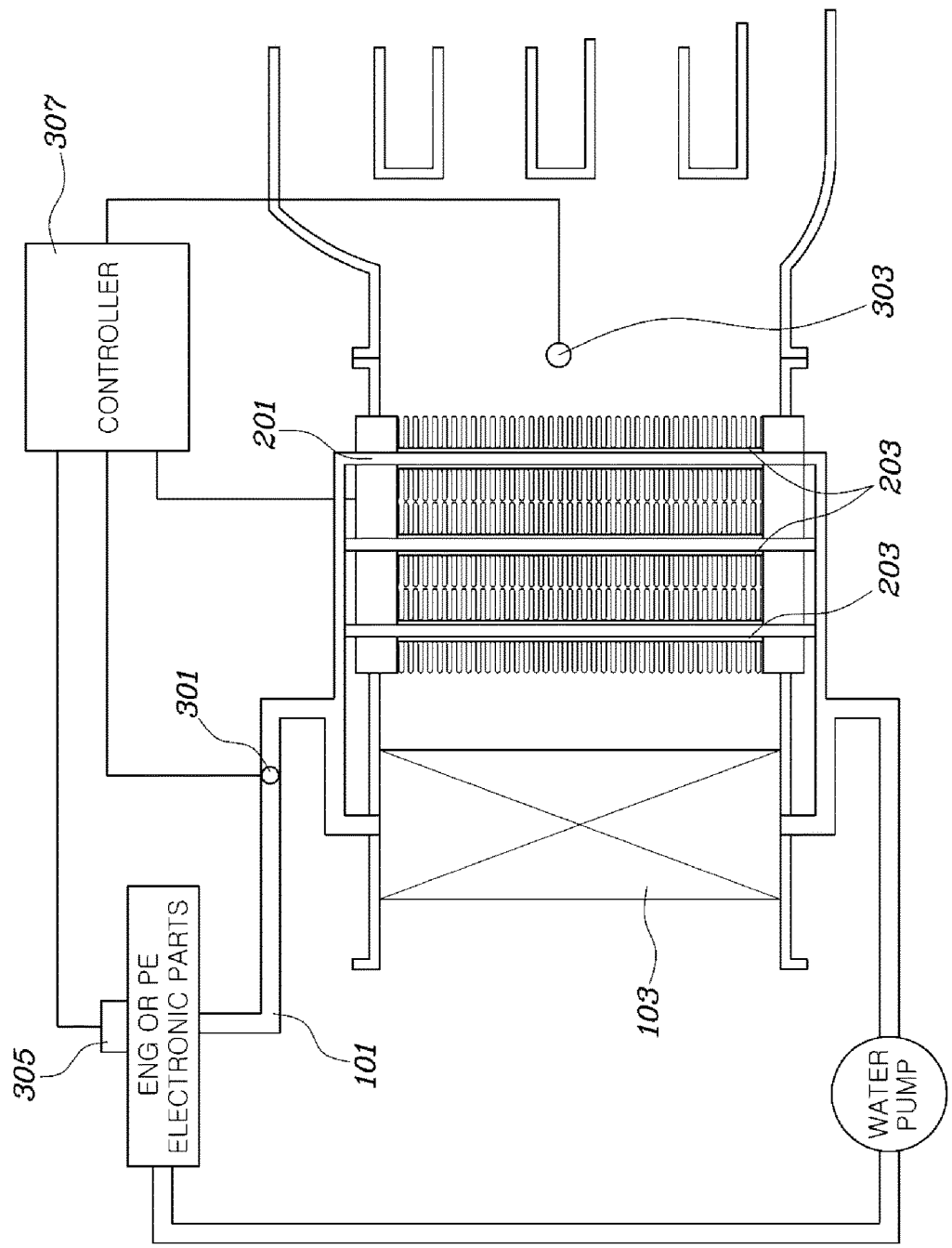
FIG. 1 is a diagram illustrating a configuration of a heating system of a hybrid vehicle according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EXEMPLARY EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

Figure 2:
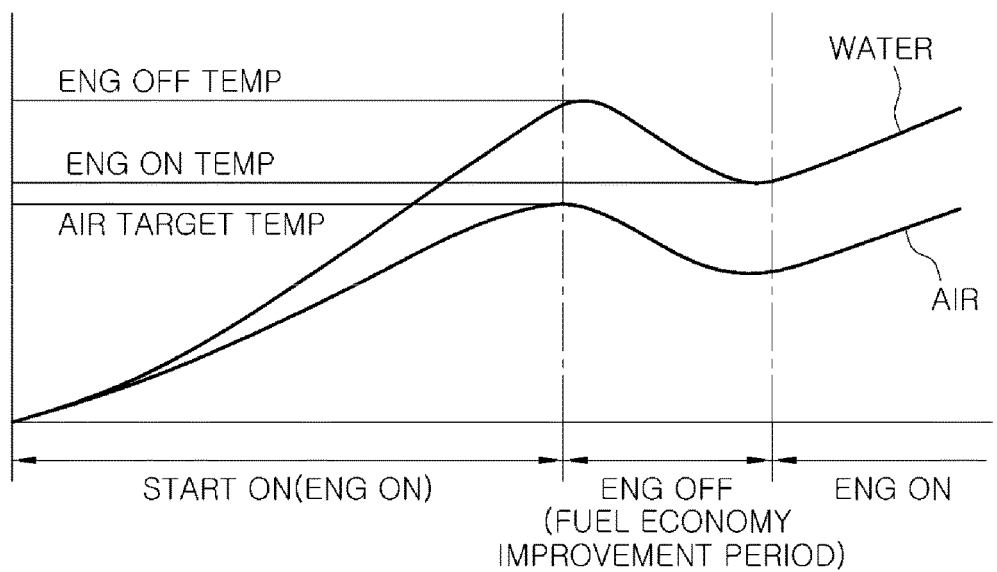
FIG. 2 is a diagram illustrating relations among an engine, cooling water and discharge air supplied to a passenger compartment in a vehicle heating system in a conventional case.
Figure 3:
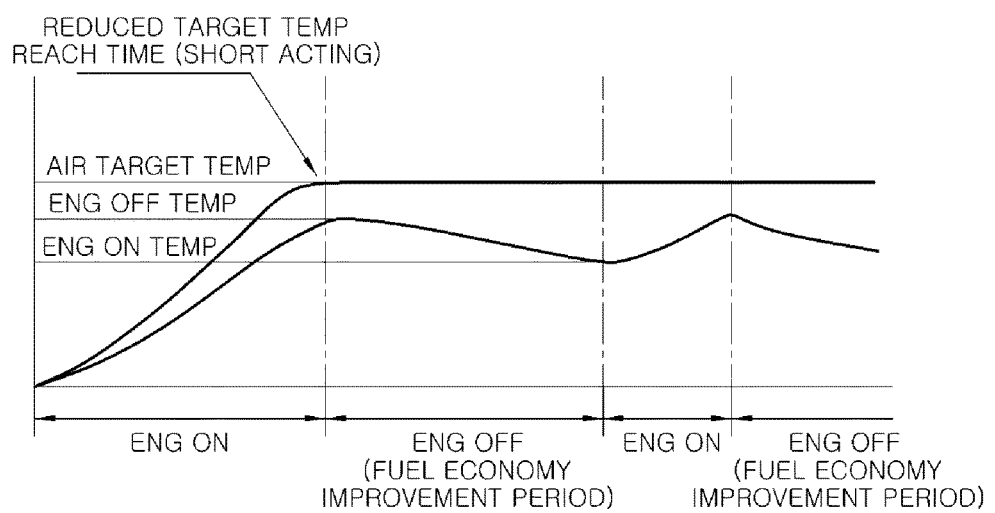
FIG. 3 is a diagram illustrating relations among an engine, cooling water and discharge air supplied to a passenger compartment in the hybrid vehicle heating system according to the illustrated embodiment of the present invention.
Figure 4:
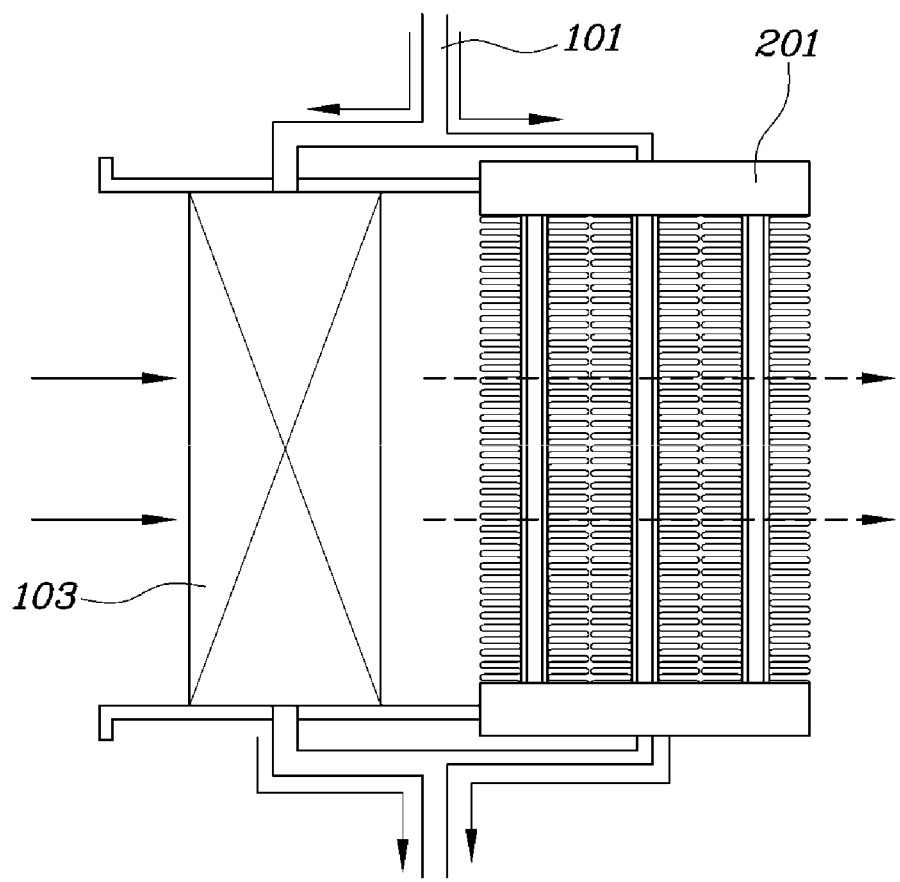
FIG. 4 is a diagram illustrating parallel connection in a heating system of a hybrid vehicle according to another embodiment of the present invention.
Figure 5:
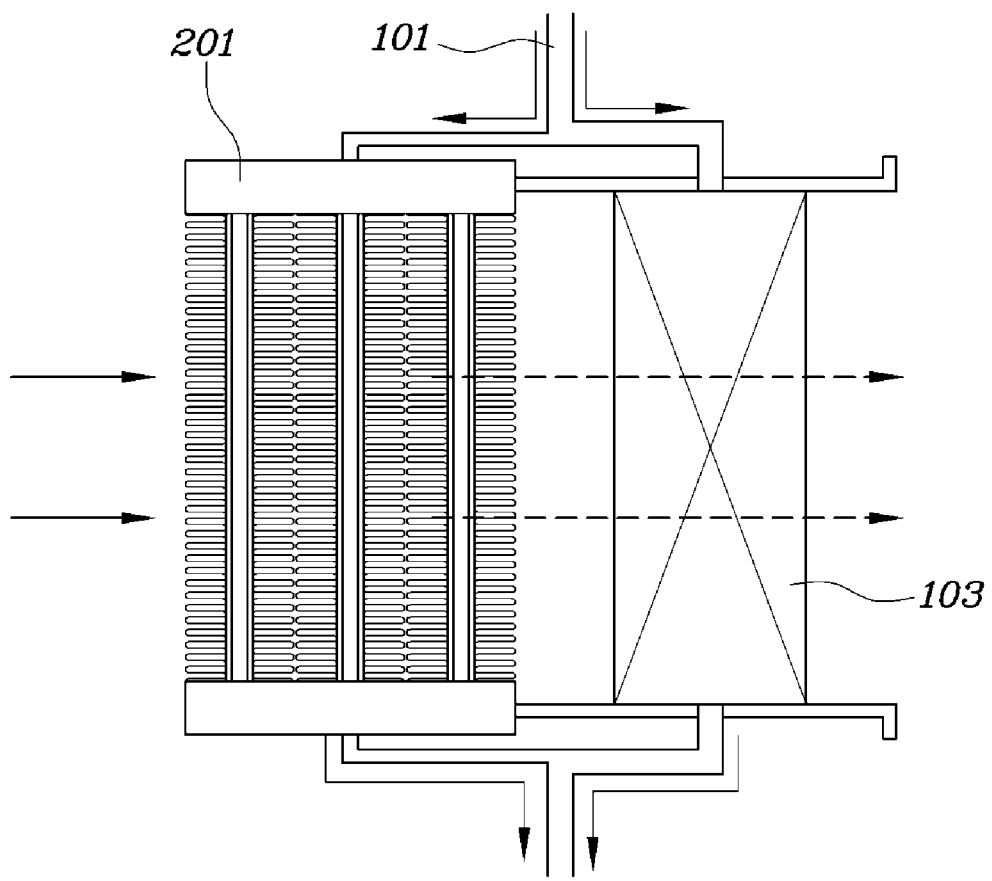
FIG. 5 is a diagram illustrating parallel connection in a heating system of a hybrid vehicle according to another embodiment of the present invention.
Figure 6:
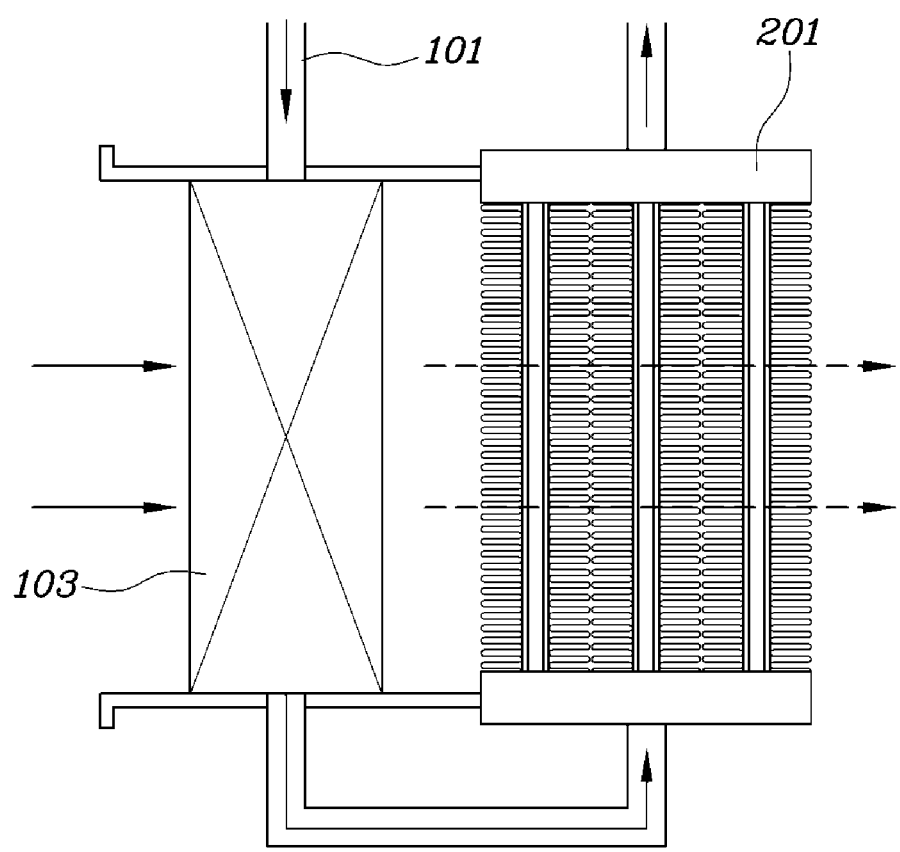
FIG. 6 is a diagram illustrating series connection in a heating system of a hybrid vehicle according to another embodiment of the present invention.
Figure 7:
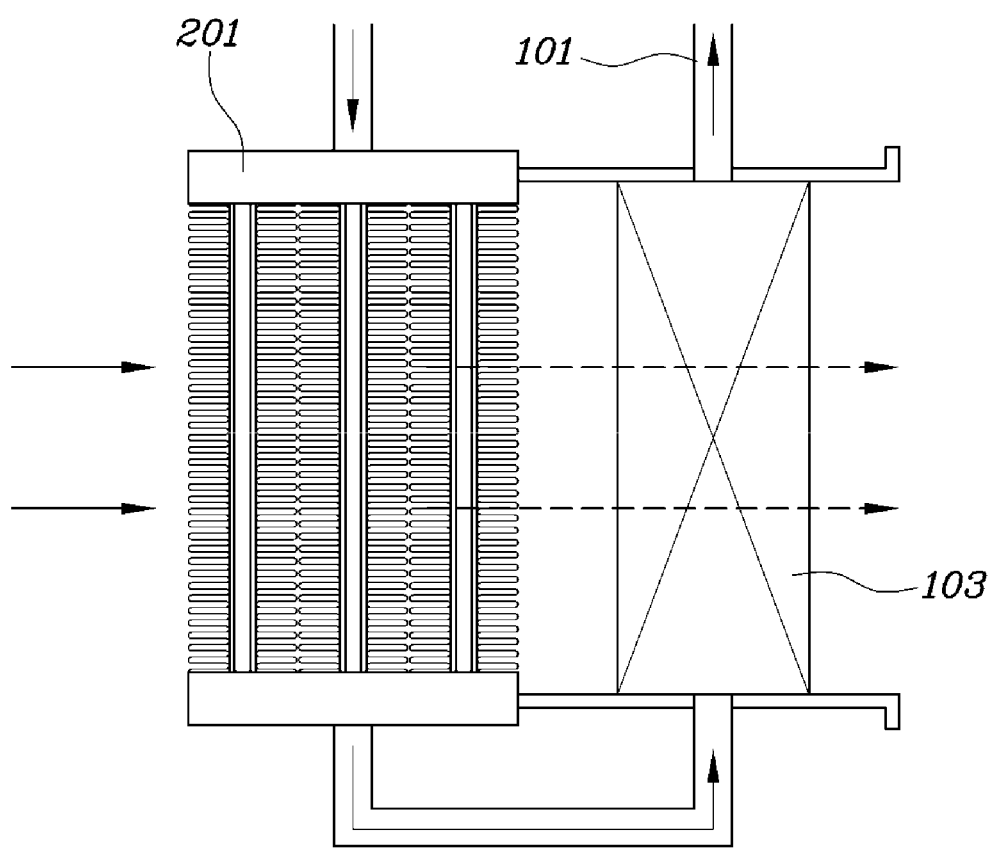
FIG. 7 is a diagram illustrating series connection in a heating system of a hybrid vehicle according to another embodiment of the present invention.
Figure 8:
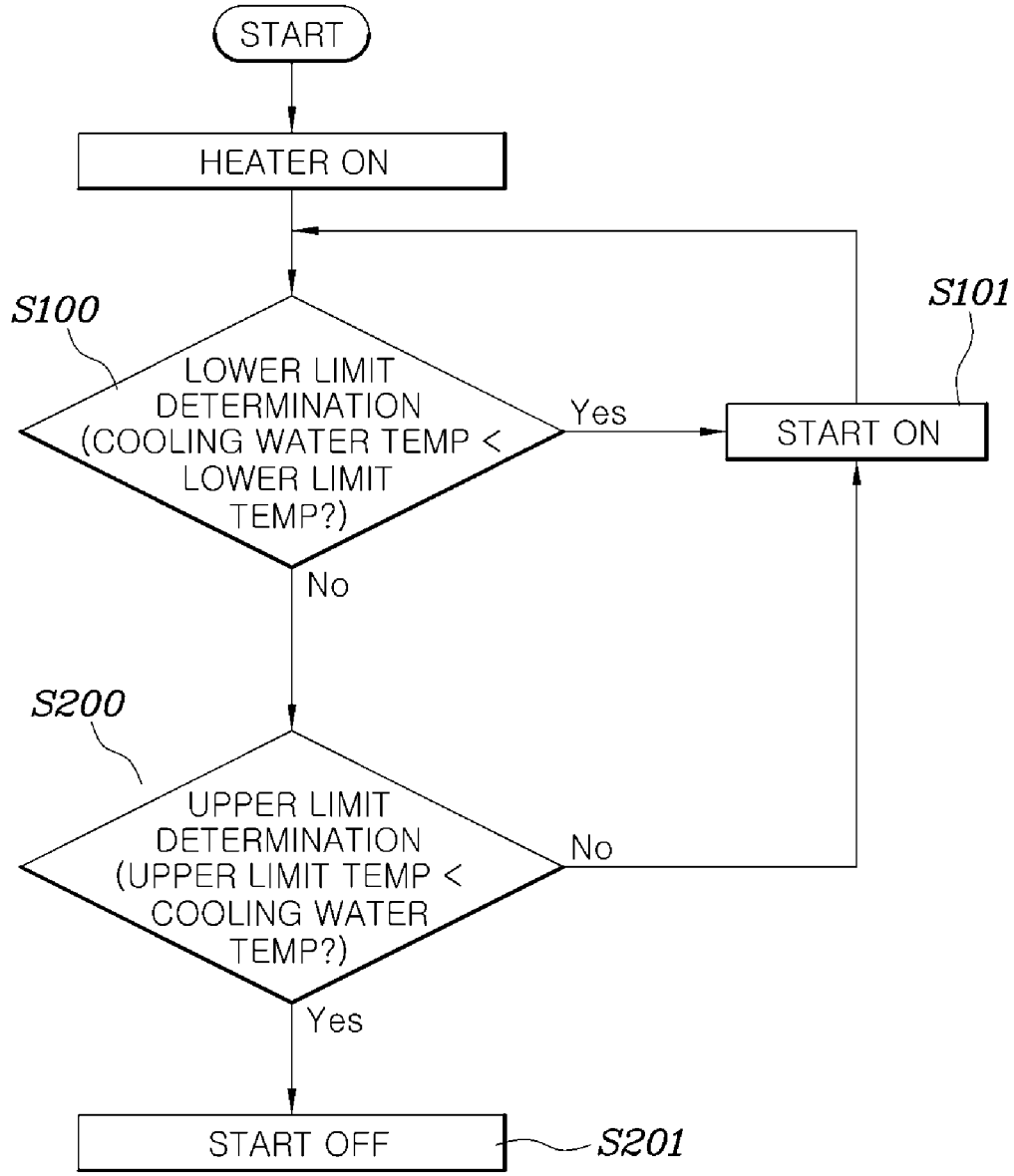
FIG. 8 is a flowchart illustrating engine control in a method for controlling the heating system of the hybrid vehicle according to one of the illustrated embodiments of the present invention.
Figure 9:
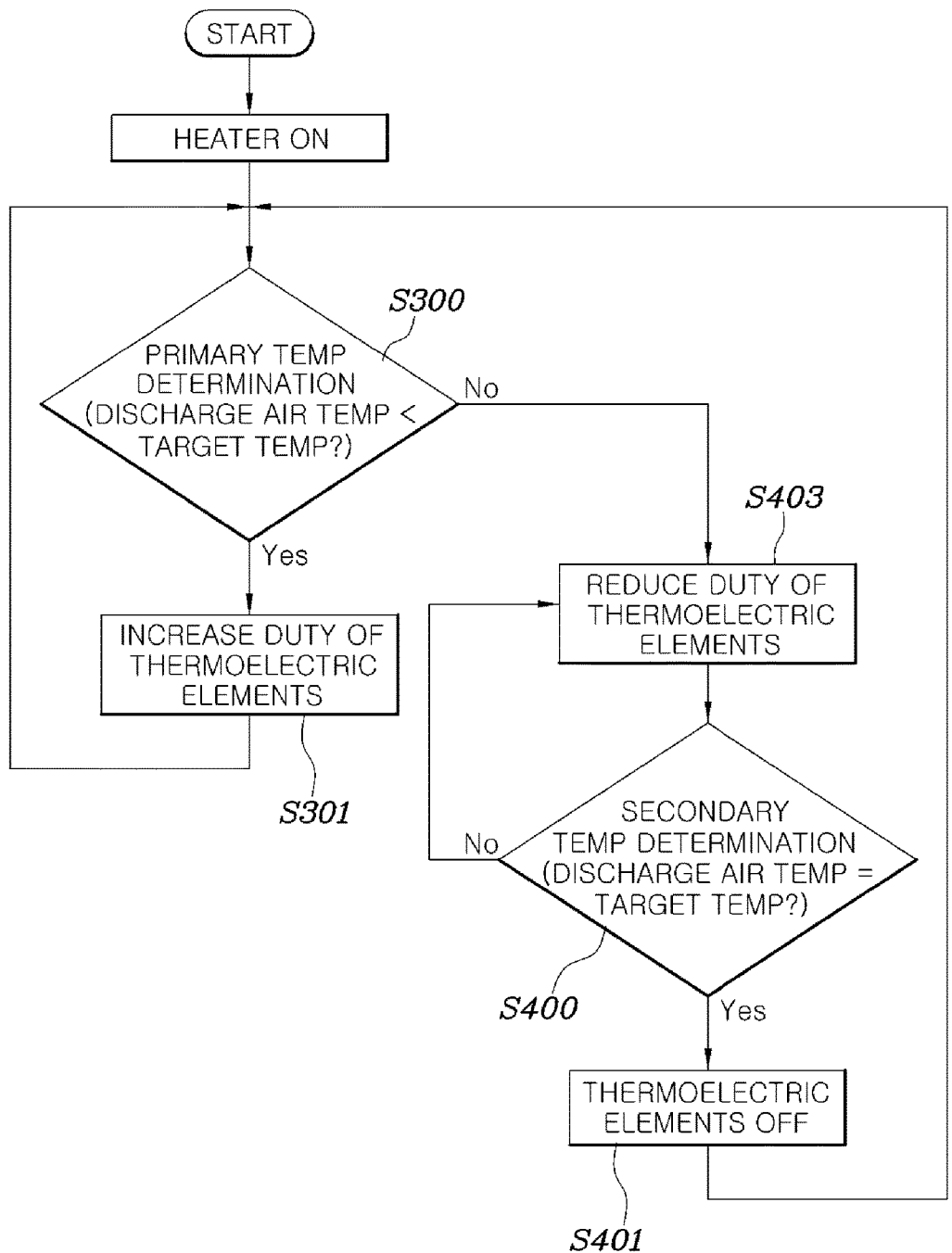
FIG. 9 is a flowchart illustrating thermoelectric element control in the method for controlling the heating system of the hybrid vehicle according to one of the illustrated embodiments of the present invention.

FIG. 1 illustrates a configuration of a heating system in a hybrid vehicle according to an exemplary embodiment of the present invention. FIG. 2 illustrates relations among an engine, cooling water and discharge air supplied to a passenger compartment in a vehicle heating system in a conventional case. FIG. 3 illustrates relations among an engine, cooling water and discharge air supplied to a passenger compartment in the hybrid vehicle heating system according to the illustrated embodiment of the present invention. FIG. 4 illustrates parallel connection in a heating system of a hybrid vehicle according to another embodiment of the present invention. FIG. 5 illustrates parallel connection in a heating system of a hybrid vehicle according to another embodiment of the present invention. FIG. 6 illustrates series connection in a heating system of a hybrid vehicle according to another embodiment of the present invention. FIG. 7 illustrates series connection in a heating system of a hybrid vehicle according to another embodiment of the present invention. FIG. 8 illustrates engine control in a method for controlling the heating system of the hybrid vehicle according to one of the illustrated embodiments of the present invention. FIG. 9 illustrates thermoelectric element control in the method for controlling the heating system of the hybrid vehicle according to one of the illustrated embodiments of the present invention.

Referring to FIG. 1, a heating system of a hybrid vehicle according to an exemplary embodiment of the present invention is illustrated. The heating system includes a cooling water line 101 connected to an engine of the vehicle, and a heat exchanger 201 provided at the cooling line 101 such that cooling water flows through the heat exchanger 201. The heat exchanger 201 is arranged within an air conditioning duct, through which air flows. The heating system also includes one or more thermoelectric elements 203 each attached, at one surface thereof, to the heat exchanger 201 while being exposed, at the other surface thereof, to air flowing through the air conditioning duct such that the other surface functions as a heating surface, and a controller 307 for controlling start or stop of the engine, to maintain temperature of the cooling water between an upper limit temperature and a lower limit temperature while controlling operation of the thermoelectric elements 203 such that temperature measured at an outlet of the air conditioning duct satisfies a target temperature.

The controller 307 may control the engine to stop when the measured temperature at the outlet of the air conditioning duct satisfies the target temperature, and the temperature of the cooling water reaches the upper limit temperature during operation of the engine.

Again referring to FIG. 1, the engine of the vehicle is connected to the cooling water line 101. As described above, the heat exchanger 201 is provided at the cooling line 101 and, as such, cooling water flows through the heat exchanger 201. The heat exchanger 201 is arranged within an air conditioning duct, through which air flows. Each thermoelectric element 203 is attached, at one surface thereof, to the heat exchanger 201 while being exposed, at the other surface thereof, to air flowing through the air conditioning duct and, as such the other surface of the thermoelectric element 203 functions as a heating surface. The controller 307 controls start or stop of the engine, to maintain temperature of the cooling water between the upper limit temperature and the lower limit temperature. The controller 307 also controls operation of the thermoelectric elements 203 such that the measured temperature at the outlet of the air conditioning duct satisfies the target temperature. The controller 307 controls the engine to stop when the measured temperature at the outlet of the air conditioning duct satisfies the target temperature, and the temperature of the cooling water reaches the upper limit temperature during operation of the engine.

Again referring to FIG. 1, the heating system further includes a heater core 103 provided at the cooling water line 101 such that cooling water flows through the heater core 103 while being arranged within the air conditioning duct, through which air flows. The heater core 103 and heat exchanger 201 may have a cooling water inlet in common and, as such, cooling water may be introduced into both the heater core 103 and the heat exchanger 201 through the common cooling water inlet. The heater core 103 and heat exchanger 201 may also have a cooling water outlet in common and, as such, cooling water from the heater core 103 and cooling water from the heat exchanger 201 may be simultaneously discharged into the cooling line through the common cooling water outlet.

When heating is required in the hybrid vehicle, passenger compartment air is heated by basically using cooling water of the engine and cooling water of electronic parts as a heat source. Of course, heating of passenger compartment air may be insufficient, using cooling water of the electronic parts alone, because temperature of the cooling water is low. To this end, heating of cooling water through engine start may be required even though engine start is not required, that is, power of the engine is not needed. However, this causes degradation of fuel economy.

The heating system of the hybrid vehicle according to an exemplary embodiment of the present invention heats air to be supplied the passenger compartment, using cooling water of the engine or electronic parts, and supplies the heated air to the passenger compartment after again heating the heated air through the thermoelectric elements 203 attached to the heat exchanger 201. In this case, the controller 307 simultaneously controls the engine and the thermoelectric elements 203.

The controller 307 controls temperature of the cooling water to be maintained between the upper limit temperature and the lower limit temperature and, as such, controls whether or not the engine should start up. The controller 307 also measures temperature of air discharged into the passenger compartment, namely, a discharge air temperature, and reflects the measured discharge air temperature on control operation thereof.

Referring to FIG. 3, for generation of discharge air of a predetermined temperature to be supplied to the passenger compartment during operation of the heating system, cooling water of the engine is heated through engine start, and temperature of the discharge air is raised by the thermoelectric elements 203. In this case, it may be possible to generate discharge air of the predetermined temperature within a short time because the cooling water and the thermoelectric elements 203 are simultaneously utilized to heat the discharge air.

Referring to FIG. 2, when the temperature of the passenger compartment is increased through control of cooling water temperature alone, as in conventional cases, the upper limit temperature and lower limit temperature for the cooling water temperature are set to be higher than those in an exemplary embodiment of the present invention and, as such, the time taken for the temperature of the cooling water to reach the upper limit temperature is long, whereas the time taken for the temperature of the cooling water having reached the upper limit temperature to be lowered to the lower limit temperature is short. As a result, the period that the engine can be in an OFF state is short and, as such, engine economy is degraded.

Again referring to FIG. 3, the heating system of the hybrid vehicle according to an exemplary embodiment of the present invention not only controls temperature of cooling water, but also controls the thermoelectric elements 203, based on sensing of discharge air temperature. Accordingly, there is an effect of reducing the upper limit temperature and lower limit temperature. As the upper limit temperature and lower limit temperature are lowered, the difference between discharge air temperature and ambient air temperature is relatively reduced and, as such, the time taken for the cooling water to be cooled is lengthened. Accordingly, the period that the engine can be in an OFF state is increased and, as such, an improvement in fuel economy may be achieved.

As described above, the heating system further includes the heater core 103, which is provided at the cooling water line 101 such that cooling water flows through the heater core 103 while being arranged within the air conditioning duct, through which air flows. In this case, cooling water may first flow through one of the heater core 103 and heat exchanger 201, and may then flow the other of the heater core 103 and heat exchanger 201.

Referring to FIGS. 4 to 7, cooling water of the engine may be simultaneously supplied to the heater core 103 and heat exchanger 201 in parallel. Alternatively, cooling water of the engine may be sequentially supplied to the heater core 103 and heat exchanger 201 in series. The arrangement of the heater core 103 and heat exchanger 201 for achieving high efficiency may depend on the environment in which the vehicle travels, ambient air temperature, cooling water temperature, and target temperature. Accordingly, an appropriate arrangement may be selected to obtain optimal performance.

Again referring to FIGS. 4 to 7, the parallel arrangement is used when the flow rate of cooling water is high, or the temperature of cooling water is high. The parallel arrangement is also used when the flow rate of cooling water through the heater core 103 is higher than the flow rate of cooling water through the heat exchanger 201, and the amount of heat discharged from the heater core 103 is great. On the other hand, the series arrangement is used when the flow rate of cooling water is low or the temperature of cooling water is low. The series arrangement is also used when the flow rate of cooling water through the heater core 103 is almost equal to the flow rate of cooling water through the heat exchanger 201.

Again referring to FIG. 1, the heating system may further include a cooling water temperature sensor 301 for sensing temperature of cooling water of the engine, a discharge air temperature sensor 303 for sensing temperature of discharge air supplied to the passenger compartment, and an engine start sensor 305 for sensing whether or not the engine starts.

Referring to FIG. 8, a method for controlling the heating system of the hybrid vehicle is illustrated. The control method includes lower limit determination S100 for comparing the temperature of cooling water with the lower limit temperature, to determine whether or not the cooling water temperature is lower than the lower limit temperature, and upper limit determination S200 for comparing the cooling water temperature with the upper limit temperature, to determine whether or not the cooling water temperature is higher than the upper limit temperature. When the cooling water temperature is lower than the lower limit temperature, the engine is controlled to operate (S101). On the other hand, when the cooling water temperature is higher than the upper limit temperature, the engine is controlled to stop (S201). A plurality of heat exchangers 201 may be arranged in the air conditioning duct. The control method further includes primary temperature determination S300 for determining whether or not the temperature of discharge air supplied to the passenger compartment is lower than the target temperature. When it is determined that the discharge air temperature is lower than the target temperature, the number of thermoelectric elements 203 to be operated is increased (S301), and the primary temperature determination S300 may then be again executed.

As illustrated in FIG. 8, in the lower limit determination S100, the controller 307 compares the temperature of cooling water sensed by the cooling water temperature sensor 301 with the lower limit temperature, and determines whether or not the sensed cooling water temperature is lower than the lower limit temperature. In the upper limit determination S200, the controller 307 compares the temperature of cooling water sensed by the cooling water temperature sensor 301 with the upper limit temperature, and determines whether or not the sensed cooling water temperature is higher than the upper limit temperature. When the sensed cooling water temperature is lower than the lower limit temperature, the controller 307 may control the engine to operate (S101). On the other hand, when the sensed cooling water temperature is higher than the upper limit temperature, the controller 307 may control the engine to stop (S201).

As described above, when the temperature of the passenger compartment is increased through control of cooling water temperature alone, as in conventional cases, the upper limit temperature and lower limit temperature for the cooling water temperature are set to be higher than those in an exemplary embodiment of the present invention and, as such, the time taken for the temperature of the cooling water to reach the upper limit temperature is long, whereas the time taken for the temperature of the cooling water having reached the upper limit temperature to be lowered to the lower limit temperature is short. As a result, the period that the engine can be in an OFF state is short and, as such, engine economy is degraded. However, the heating system of the hybrid vehicle according to an exemplary embodiment of the present invention not only controls temperature of cooling water, but also controls the thermoelectric elements 203, based on sensing of discharge air temperature. Accordingly, there is an effect of reducing the upper limit temperature and lower limit temperature. As the upper limit temperature and lower limit temperature are lowered, the difference between discharge air temperature and ambient air temperature is relatively reduced and, as such, the time taken for the cooling water to be cooled is lengthened. Accordingly, the period that the engine can be in an OFF state is increased and, as such, an improvement in fuel economy may be achieved.

In this case, in order to rapidly raise the temperature of air discharged into the passenger compartment, it may be possible to adjust electric power supplied to the thermoelectric elements 203 or to increase the number of thermoelectric elements 203 to be operated. Accordingly, there is an advantage in that temperature of discharge air supplied to the passenger compartment can rapidly reach the target temperature.

Referring to FIG. 9, when it is determined through the primary temperature determination S300 that the temperature of discharge air supplied to the passenger compartment is not lower than the target temperature, the number of thermoelectric elements 203 to be operated may be reduced. The control method may further include secondary temperature determination S400 for determining whether or not the temperature of discharge air supplied to the passenger compartment is equal to the target temperature. When it is determined that the temperature of discharge air supplied to the passenger compartment is equal to the target temperature, operation of the thermoelectric elements 203 may be stopped (S401). On the other hand, when it is determined that the temperature of discharge air supplied to the passenger compartment is not equal to the target temperature, the number of thermoelectric elements 203 to be operated may be reduced (S403), and the secondary temperature determination S400 may then be again executed.

As illustrated in FIG. 9, in the primary temperature determination S300, the controller 307 senses the temperature of discharge air supplied to the passenger compartment by the discharge air temperature sensor 303, and determines whether or not the sensed temperature is lower than the target temperature. When it is determined through the first temperature determination S300 that the discharge air temperature is lower than the target temperature, the controller 307 may increase the number of thermoelectric elements 203 to be operated (S301), and may then again execute the primary temperature determination S300.

In the secondary temperature determination S400, the controller 307 senses the temperature of discharge air supplied to the passenger compartment by the discharge air temperature sensor 303, and determines whether or not the sensed temperature is equal to the target temperature. When it is determined through the secondary temperature determination S400 that the sensed temperature is equal to the target temperature, the controller 307 may control the thermoelectric elements 203 to stop (S401).

When the discharge air temperature reaches the target temperature, the number of thermoelectric elements 203 to be operated is reduced (S403), and, finally, operation of the thermoelectric elements 203 is stopped (S401), to reduce energy consumption. Thus, there is an effect of achieving an enhancement in fuel economy of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heating system of a hybrid vehicle comprising:
a cooling water line connected to an engine of the vehicle;
a plurality of heat exchangers provided at the cooling water line such that cooling water flows through the heat exchangers, the plurality of heat exchangers being arranged within an air conditioning duct, through which air flows;
a plurality of thermoelectric elements each attached, at a first surface thereof, to each of the plurality of heat exchangers while being exposed, at a second surface thereof, to air flowing through the air conditioning duct such that the second surface functions as a heating surface; and
a controller for controlling start or stop of the engine, to maintain a cooling water temperature between an upper limit temperature and a lower limit temperature while controlling operation of the plurality of thermoelectric elements such that a temperature measured at an outlet of the air conditioning duct satisfies a target temperature,
wherein the controller performs a primary temperature determination for determining whether or not a temperature of discharge air supplied to a passenger compartment is lower than the target temperature,
wherein, when it is determined through the primary temperature determination that the temperature of the discharge air supplied to the passenger compartment is lower than the target temperature, the controller increases a number of operated thermoelectric elements among the plurality of thermoelectric elements, and the controller executes the primary temperature determination again, and
wherein, when it is determined through the primary temperature determination that the temperature of the discharge air supplied to the passenger compartment is not lower than the target temperature, the controller reduces the number of operated thermoelectric elements among the plurality of thermoelectric elements.

2. The heating system according to claim 1, wherein the controller controls the engine to stop when the temperature measured at the outlet of the air conditioning duct satisfies the target temperature, and the cooling water temperature reaches the upper limit temperature during operation of the engine.

3. The heating system according to claim 1, further comprising:
a heater core provided at the cooling water line such that the cooling water flows through the heater core while being arranged within the air conditioning duct, through which air flows,
wherein the heater core and the heat exchangers have a cooling water inlet in common such that the cooling water is introduced into both the heater core and the heat exchangers through the common cooling water inlet, and the heater core and the heat exchangers have a cooling water outlet in common such that the cooling water from the heater core and the cooling water from the heat exchangers are simultaneously discharged into the cooling water line through the common cooling water outlet, and
wherein a flow of the cooling water and a flow of the air intersect with each other in each of the heater core and the heat exchangers.

4. The heating system according to claim 1, further comprising:
a heater core provided at the cooling water line such that the cooling water flows through the heater core while being arranged within the air conditioning duct, through which air flows,
wherein the cooling water first flows through one of the heater core and the heat exchangers, and then flows the other of the heater core and the heat exchangers, and
wherein a flow of the cooling water and a flow of the air intersect with each other in each of the heater core and the heat exchangers.

5. The heating system according to claim 1, further comprising:
- a cooling water temperature sensor for sensing the cooling water temperature of the engine;
- a discharge air temperature sensor for sensing the temperature of the discharge air supplied to the passenger compartment; and
- an engine start sensor for sensing whether or not the engine starts.

6. A method for controlling the heating system according to claim 1, comprising:
- lower limit determination for comparing the cooling water temperature with the lower limit temperature, to determine whether or not the cooling water temperature is lower than the lower limit temperature; and
- upper limit determination, for comparing the cooling water temperature with the upper limit temperature, to determine whether or not the cooling water temperature is higher than the upper limit temperature,
- wherein the engine is controlled to operate when the cooling water temperature is lower than the lower limit temperature, and is controlled to stop when the cooling water temperature is higher than the upper limit temperature.

7. The method according to claim 6, further comprising:
- primary temperature determination for determining whether or not the temperature of the discharge air supplied to the passenger compartment is lower than the target temperature,
- wherein, when it is determined through the primary temperature determination that the temperature of the discharge air supplied to the passenger compartment is lower than the target temperature, the number of the plurality of thermoelectric elements to be operated is increased, and the primary temperature determination is then again executed.

8. The method according to claim 7, wherein, when it is determined through the primary temperature determination that the temperature of the discharge air supplied to the passenger compartment is not lower than the target temperature, the number of the plurality of thermoelectric elements to be operated is reduced.

9. The method according to claim 8, further comprising:
- secondary temperature determination for determining whether or not the temperature of discharge air supplied to the passenger compartment is equal to the target temperature,
- wherein, when it is determined through the secondary temperature determination that the temperature of the discharge air supplied to the passenger compartment is equal to the target temperature, operation of the plurality of thermoelectric elements is stopped.

10. The method according to claim 9, wherein, when it is determined through the secondary temperature determination that the temperature of the discharge air supplied to the passenger compartment is not equal to the target temperature, the number of the plurality of thermoelectric elements to be operated is reduced, and the secondary temperature determination is then again executed.

11. A method for controlling the heating system according to claim 1, comprising:
- lower limit determination executed by the controller to compare a temperature of the cooling water sensed by a cooling water temperature sensor with the lower limit temperature, and to determine whether or not the sensed temperature of the cooling water is lower than the lower limit temperature;
- upper limit determination executed by the controller to compare the sensed cooling water temperature with the upper limit temperature, and to determine whether or not the sensed temperature of the cooling water is higher than the upper limit temperature,
- wherein the engine is controlled by the controller to operate when the sensed temperature of the cooling water is lower than the lower limit temperature, and is controlled by the controller to stop when the sensed temperature of the cooling water is higher than the upper limit temperature.

12. The method according to claim 11, further comprising:
- primary temperature determination executed by the controller to sense the temperature of the discharge air supplied to the passenger compartment by a discharge air temperature sensor, and to determine whether or not the sensed temperature of the discharge air supplied to the passenger compartment is lower than the target temperature,
- wherein, when it is determined through the primary temperature determination that the temperature of the discharge air supplied to the passenger compartment is lower than the target temperature, the number of the plurality of thermoelectric elements to be operated is increased by the controller, and the primary temperature determination is then again executed by the controller.

13. The method according to claim 12, further comprising:
- secondary temperature determination executed by the controller to sense the temperature of the discharge air supplied to the passenger compartment by the discharge air temperature sensor, and to determine whether or not the sensed temperature of the discharge air supplied to the passenger compartment is equal to the target temperature,
- wherein, when it is determined through the secondary temperature determination that the sensed temperature of the discharge air supplied to the passenger compartment is equal to the target temperature, the plurality of thermoelectric elements is controlled to be stopped by the controller.

* * * * *